US010209144B2

(12) United States Patent
Fukui et al.

(10) Patent No.: US 10,209,144 B2
(45) Date of Patent: Feb. 19, 2019

(54) DETERIORATION DETECTOR AND THERMOCOUPLE INSPECTION DEVICE

(71) Applicant: Kobe Steel, Ltd., Hyogo (JP)

(72) Inventors: Toshihide Fukui, Kobe (JP); Eiji Takahashi, Kobe (JP); Chitaka Manabe, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 161 days.

(21) Appl. No.: 15/108,869

(22) PCT Filed: Nov. 21, 2014

(86) PCT No.: PCT/JP2014/080929
§ 371 (c)(1),
(2) Date: Jun. 29, 2016

(87) PCT Pub. No.: WO2015/102070
PCT Pub. Date: Jul. 9, 2015

(65) Prior Publication Data
US 2016/0327438 A1    Nov. 10, 2016

(30) Foreign Application Priority Data

Jan. 6, 2014  (JP) ................................. 2014-000382
Jan. 6, 2014  (JP) ................................. 2014-000561

(51) Int. Cl.
*G01K 15/00*     (2006.01)
*B29B 7/72*      (2006.01)
(Continued)

(52) U.S. Cl.
CPC ............ *G01K 15/007* (2013.01); *B29B 7/724* (2013.01); *B29B 7/726* (2013.01); *G01K 1/08* (2013.01);
(Continued)

(58) Field of Classification Search
CPC .................................................... G01K 15/007
(Continued)

(56) References Cited

U.S. PATENT DOCUMENTS 5,139,345 A    8/1992  Schäfer et al.
5,828,567 A    10/1998 Eryurek et al.
(Continued)

FOREIGN PATENT DOCUMENTS

JP    H08-313466 A    11/1996
JP    H09-061251 A    3/1997
(Continued)

OTHER PUBLICATIONS

Supplementary Partial European Search Report issued by the European Patent Office dated Jul. 20, 2017, which corresponds to European patent Application No. 14876373.3 and is related to U.S. Appl. No. 15/108,869.

(Continued)

*Primary Examiner* — Daniel S Larkin
*Assistant Examiner* — Anthony W Megna Fuentes
(74) *Attorney, Agent, or Firm* — Studebaker & Brackett PC

(57) ABSTRACT

A protection tube thermocouple (5) includes a thermocouple (52), and a protection tube (51) which accommodates the thermocouple (52). The protection tube (51) includes a conical portion (511) formed on a front end (54) side of the protection tube (51); and a hollow portion (53) which extends in the length direction of the protection tube (51) for connecting between a front end (54) and a rear end (55) of the protection tube (51) in the inside of the protection tube (51), and into which the thermocouple (52) is received. The hollow portion (53) in the conical portion (511) has a tapered portion (532) configured such that the sectional area of the hollow portion (53) decreases toward the front end (54).

7 Claims, 12 Drawing Sheets

(51) Int. Cl.
  *G01K 1/08* (2006.01)
  *B29B 7/74* (2006.01)
  *B29B 7/56* (2006.01)

(52) U.S. Cl.
  CPC .............. *B29B 7/56* (2013.01); *B29B 7/728* (2013.01); *B29B 7/7495* (2013.01)

(58) Field of Classification Search
  USPC ............................................................ 374/4
  See application file for complete search history.

(56) References Cited

U.S. PATENT DOCUMENTS

| | | |
|---|---|---|
| 5,956,663 A | 9/1999 | Eryurek |
| 6,434,504 B1 | 8/2002 | Eryurek et al. |
| 6,449,574 B1 | 9/2002 | Eryurek et al. |
| 6,519,546 B1 | 2/2003 | Eryurek et al. |
| 6,594,603 B1 | 7/2003 | Eryurek et al. |
| 6,601,005 B1 | 7/2003 | Eryurek et al. |
| 6,754,601 B1 | 6/2004 | Eryurek et al. |
| 2004/0024568 A1 | 2/2004 | Eryurek et al. |
| 2011/0158287 A1* | 6/2011 | Clark .................. G01D 11/245 374/185 |
| 2015/0233849 A1 | 8/2015 | Fukui et al. |
| 2015/0330839 A1* | 11/2015 | Yada ........................ G01K 1/14 366/91 |

FOREIGN PATENT DOCUMENTS

| | | |
|---|---|---|
| JP | H09-218107 A | 8/1997 |
| JP | 2002-523820 A | 7/2002 |
| JP | 2014-098646 A | 5/2014 |

OTHER PUBLICATIONS

Extended European Search Report (EESR) dated Nov. 21, 2017, from corresponding EP Appl No. 148763713, 12 pp.

International Search Report issued in PCT/JP2014/080929; dated Feb. 24, 2015.

Notification of Transmittal of the International Preliminary Report on Patentability and Translation of Written Opinion of the International Searching Authority; PCT/JP2014/080929 dated Jul. 12, 2016.

\* cited by examiner

DETERIORATION DETECTOR AND THERMOCOUPLE INSPECTION DEVICE

TECHNICAL FIELD

The present invention relates to a technology of testing a protection tube thermocouple for use in measuring a temperature of a mixing object being mixed in a mixing machine.

BACKGROUND ART

A process of manufacturing rubber articles or plastic articles includes a process of mixing a plurality of kinds of materials such as rubber or plastic materials into a mixing object. A temperature of the mixing object is used as an index representing a degree of mixing of the materials. In view of the above, the temperature of the mixing object is measured during a mixing operation.

A thermocouple is used for measuring a temperature of a mixing object. The mixing object has a high viscosity. Therefore, contact of the mixing object being mixed with a thermocouple may damage the thermocouple. In view of the above, a protection tube thermocouple having a structure, in which a thermocouple is accommodated in a tubular member is used.

The protection tube thermocouple is a thermocouple having a structure, in which thermocouple wires are accommodated in a protection tube made of metal or ceramic. Examples of the aforementioned thermocouple are a protection tube thermocouple and a sheath thermocouple.

The protection tube thermocouple is deteriorated, as it is used. Therefore, a technique of detecting deterioration of the protection tube thermocouple has been proposed. For instance, as a technique of detecting deterioration of a protection tube thermocouple, the thermocouple deterioration detection device disclosed in patent literature 1 is proposed. The thermocouple deterioration detection device includes a first thermocouple whose tip portion is mounted on a measurement object; a second thermocouple which is provided in proximity to the first thermocouple and whose length is shorter than the length of the first thermocouple; and processing means which compares between the output of the first thermocouple and the output of the second thermocouple, judges that the first thermocouple is deteriorated when the output difference between the first thermocouple and the second thermocouple exceeds a predetermined value, and generates a deterioration detection signal.

A protection tube thermocouple is a very important element in measuring a temperature of a mixing object being mixed. However, due to the poor responsiveness of the protection tube thermocouple, a temperature lower than the actual temperature (e.g. a temperature lower by about 10 to 20° C.) may be displayed. As a method for improving the temperature responsiveness, there is proposed a method of reducing the volume of the protection tube in order to reduce the heat capacity.

However, reducing the volume of the protection tube may lower the strength of the protection tube. Therefore, there is a problem such that the protection tube may be broken during a mixing operation, and a broken part may be included in the mixing object. This may adversely affect the process. Further, patent literature 1 fails to disclose the description relating to improvement of the strength and responsiveness of the protection tube. There is room for improvement in this point.

CITATION LIST

Patent Literature

Patent literature 1: Japanese Unexamined Patent Publication No. Hei 09-218107

SUMMARY OF INVENTION

An object of the invention is to provide a deterioration detection device provided with a protection tube thermocouple having an improved responsiveness, while maintaining the strength.

A deterioration detection device according to an aspect of the invention is a deterioration detection device provided with a protection tube thermocouple for detecting deterioration of the protection tube thermocouple by applying current to the protection tube thermocouple. The protection tube thermocouple includes a thermocouple, and a protection tube which accommodates the thermocouple. The protection tube includes a conical portion formed on a front end side of the protection tube; and a hollow portion which extends in a length direction of the protection tube for connecting between a front end and a rear end of the protection tube in the inside of the protection tube, and into which the thermocouple is received. The hollow portion in the conical portion has a tapered portion configured such that a sectional area of the hollow portion decreases toward the front end.

According to the aspect, it is possible to enhance the responsiveness of the protection tube thermocouple, while maintaining the strength of the protection tube thermocouple.

DESCRIPTION OF EMBODIMENT

Figure 1:
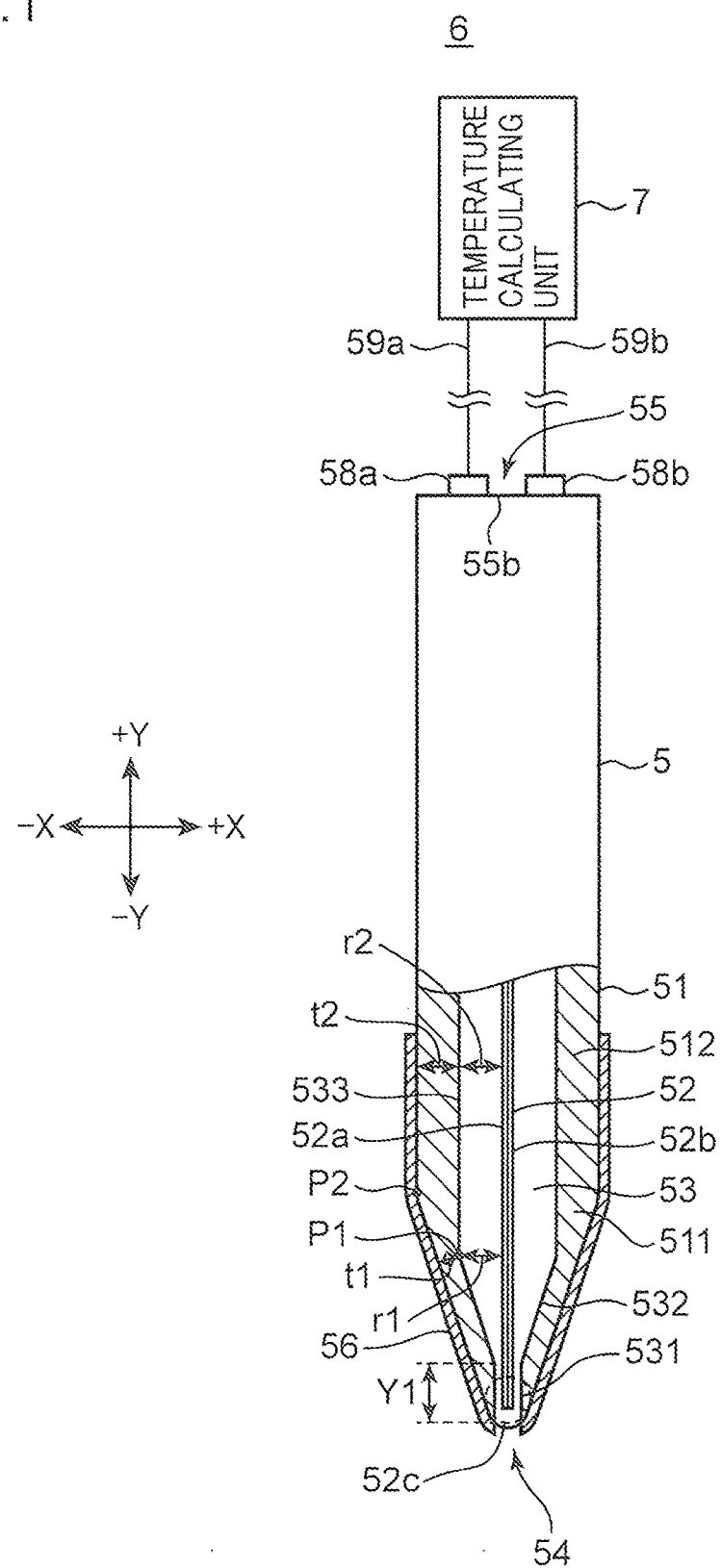
FIG. 1 is a diagram illustrating an example of a temperature measuring device provided in a deterioration detection device according to an embodiment of the invention.

FIG. 1 is a diagram illustrating an example of a temperature measuring device 6 provided in a deterioration detection device according to an embodiment of the invention. The deterioration detection device is a device for detecting deterioration of a protection tube thermocouple 5 by applying current to the protection tube thermocouple 5. The temperature measuring device 6 is provided with the protection tube thermocouple 5 and a temperature calculating unit 7.

In FIG. 1, Y direction represents the length direction of the protection tube thermocouple 5, +Y direction represents the direction of the rear end 55 side, and −Y direction represents the direction of the front end 54 side. X direction represents the width direction of the protection tube thermocouple 5 orthogonal to the length direction of the protection tube thermocouple 5, −X direction represents the left direction, on the plane of the drawing, and +X direction represents the right direction on the plane of the drawing.

The protection tube thermocouple 5 is provided with a thermocouple 52, and a protection tube 51 which accommodates the thermocouple 52. The thermocouple 52 is constituted of a pair or wires 52a and 52b extending in Y direction. An insulating film not illustrated) is formed on the outer circumference of the wires 52a and 52b. The wires 52a and 52b are insulated. The wires 52a and 52b are electrically connected at a front end 54, and a temperature measuring contact 52c is formed.

The protection tube 51 is made of metal, for instance. An example of the metal composing the protection tube 51 may be an SCM (chrome molybdenum steel) material.

The protection tube 51 includes a conical portion 511 formed on the front end 54 side, and a main body portion 512 formed on the rear end 55 side with respect to the conical portion 511. The conical portion 511 has a conical shape such that the conical portion 511 is gradually tapered toward the front end 54. The main body portion 512 continues to the conical portion 511, and has an elongated cylindrical shape extending in Y direction.

A hollow portion 53 extending in Y direction is formed in the inside of the protection tube 51. The thermocouple 52 is received in the hollow portion 53. The thermocouple 52 is connected to a rear end surface 55b formed on a rear end 55.

The hollow portion 53 includes, in the order from the front end 54 side, a frontal cylindrical portion 531, a tapered portion 532, and a cylindrical portion 533. The frontal cylindrical portion 531 is opened toward the front end 54, and has a cylindrical shape. The diameter of the frontal cylindrical portion 531 is slightly larger than the diameter of the thermocouple 52. The thermocouple 52 is received halfway through the frontal cylindrical portion 531. In other words, the temperature measuring contact 52c is embedded in the frontal cylindrical portion 531, and is protected by the protection tube 51.

The tapered portion 532 continues to the frontal cylindrical portion 531 on the front end 54 side, and continues to the cylindrical portion 533 on the rear end 55 side. The tapered portion 532 has a tapered shape such that the sectional area thereof decreases toward the front end 54. Further, the cross section of the tapered portion 532 has a circular shape. For instance, the tilt angle of the tapered portion 532 with respect to Y direction is the same as the tilt angle of the conical portion 511 with respect to Y direction. This is merely an example. The angle of the tapered portion 532 and the angle of the conical portion 511 with respect to Y direction may differ from each other.

The connection position P1 between the tapered portion 532 and the cylindrical portion 533 is formed on the front end 54 side with respect to the connection position P2 between the conical portion 511 and the main body portion 512. The radius r1 of the tapered portion 532 is the same as the radius r2 of the cylindrical portion 533 at the connection position P1. Further, the thickness t2 of the main body portion 512 is larger than the thickness t1 of the tapered portion 532 of the protection tube 51. According to this configuration, in the example of FIG. 1, the thickness t1 of the tapered portion 532 of the protection tube 51 is smaller than the thickness of the other portion of the protection tube 51. Therefore, the strength of the protection tube 51 at a position where the tapered portion 532 is formed is lower than the strength of the other portion of the protection tube 51. It should be noted that the thickness t1 is set to be a value substantially the same as the thickness t30 to be described later referring to FIG. 3. The value of the thickness t1 is a value capable of maintaining a predetermined reference strength, taking into consideration the material of the protection tube 51. In this way, a certain strength of the protection tube is secured.

Figure 6:
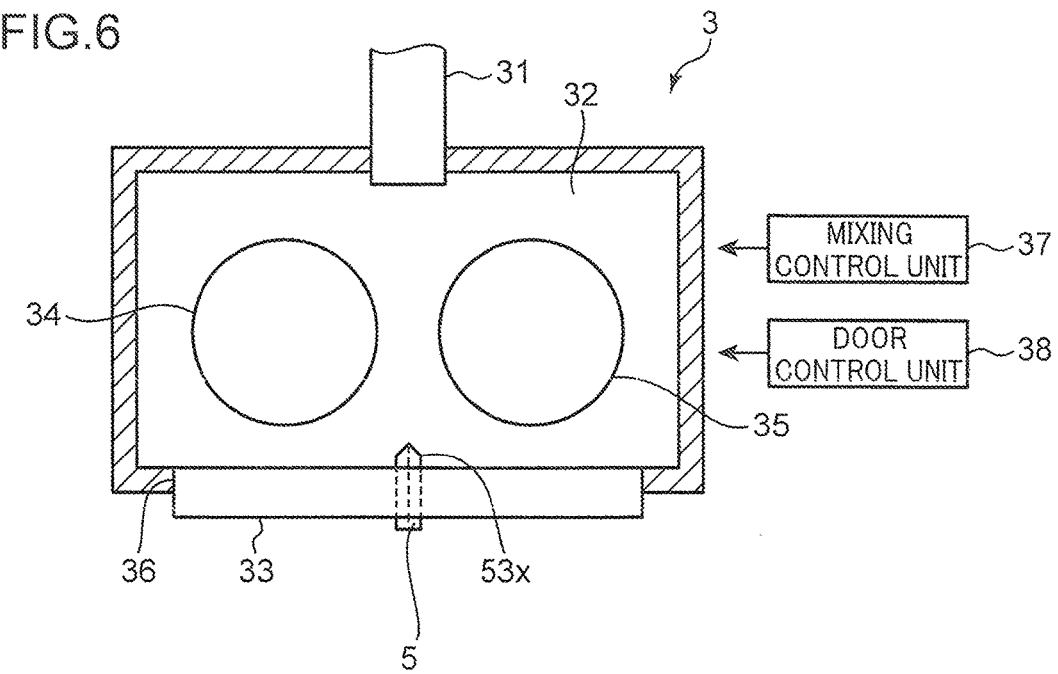
FIG. 6 is a schematic diagram illustrating an example of a mixing machine.

A plating layer 56 is formed on the front end 54 side of the protection tube 51. Specifically, the plating layer 56 is formed from the front end 54 of the conical portion 511 to an intermediate region of the main body portion 512. As illustrated in FIG. 6, the plating layer 56 is formed at a tip portion 53x, of the protection tube thermocouple 5, which is located in the inside of a door portion 33. The plating layer 56 may be formed on the entire surface of the protection tube 51.

The temperature calculating unit 7 is electrically connected to external wirings 59a and 59b. The thermocouple 52 generates a thermoelectromotive force by the heat transferred to the temperature measuring contact 52c. The thermoelectromotive force is transmitted to the temperature calculating unit 7 by the external wirings 59a and 59b. The temperature calculating unit 7 calculates a temperature (for instance, a temperature of a mixing object M in a mixing chamber 32 illustrated in FIG. 6), with use of the transmitted thermoelectromotive force. The temperature measuring device 6 is a device for measuring a temperature, with use of a thermoelectromotive force generated in the thermocouple 52.

Figure 3:
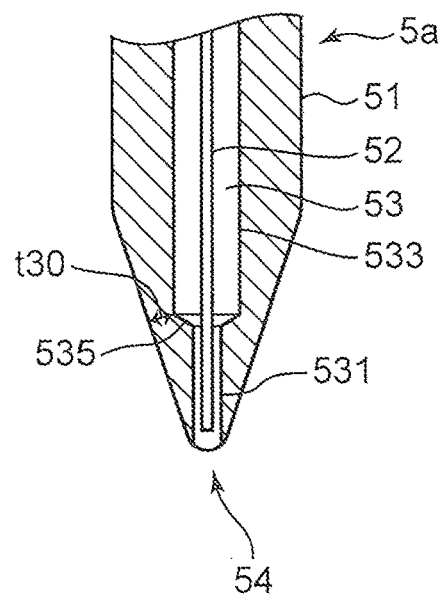
FIG. 3 is a diagram illustrating a comparative example of the protection tube thermocouple in FIG. 1.
Figure 4:
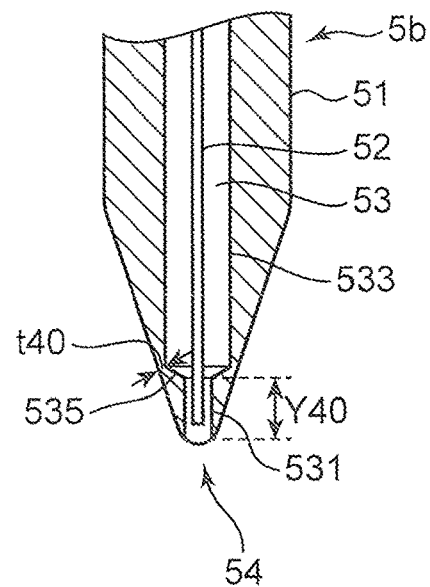
FIG. 4 is a diagram illustrating a comparative example of the protection tube thermocouple in FIG. 1.
Figure 5:
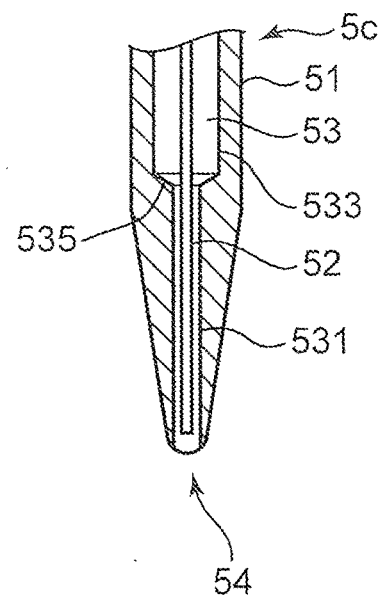
FIG. 5 is a diagram illustrating a comparative example of the protection tube thermocouple in FIG. 1.

FIG. 3 to FIG. 5 are diagrams illustrating comparative examples of the protection tube thermocouple 5 in FIG. 1. A protection tube thermocouple 5a illustrated in FIG. 3 is configured such that a hollow portion 53 is formed in the length direction of a protection tube, and a thermocouple 52 is received in the hollow portion 53, as well as the configuration illustrated in FIG. 1. The hollow portion 53 is provided with a frontal cylindrical portion. 531 formed on the front end 54 side, and a cylindrical portion 533 having a larger radius than the radius of the frontal cylindrical portion 531, taking into consideration the manufacturing feasibility.

The frontal cylindrical portion 531 and the cylindrical portion 533 continue to each other via a step portion 535.

Protection tube thermocouples 5b and 5c as comparative examples illustrated in FIG. 4 and FIG. 5 have enhanced temperature responsiveness, as compared with the protection tube thermocouple 5a. The volume of the protection tube 51 of the protection tube thermocouple 5a is large. This may deteriorate the temperature responsiveness. In view of the above, the protection tube thermocouple 5b is configured such that a cylindrical portion 533 is formed on the front end 54 side in order to shorten the length of a frontal cylindrical portion 531. Accordingly to this configuration, the volume of a protection tube 51 of the protection tube thermocouple 5b on the front end 54 side is reduced, as compared with the protection tube thermocouple 5a. This leads to reduction of the heat capacity of the protection tube 51, and the temperature responsiveness is enhanced.

Further, in the protection tube thermocouple 5c, the outer diameter of a protection tube 51 is set to be small. In addition to the above, in the protection tube thermocouple 5c, the length of a frontal cylindrical portion 531 is set to be long, as compared with the protection tube thermocouples 5a and 5b. In the protection tube thermocouple 5c, the heat capacity of the protection tube 51 is reduced, and the temperature responsiveness is enhanced.

However, in the protection tube thermocouple 5b, the strength of the protection tube 51 may be lowered because the volume of the protection tube 51 is reduced. Specifically, in the protection tube thermocouple 5b, the thickness t40 of a step portion 535 of the protection tube 51 is remarkably small, as compared with the thickness t30 of the step portion 535 of the protection tube thermocouple 5a. This may lower the strength of the protection tube thermocouple 5b at a position where the step portion 535 is formed.

Further, in the protection tube thermocouple 5c, the radius of a cylindrical portion 533 is the same as that of the protection tube thermocouple 5a. Therefore, the thickness of the cylindrical portion 533 of the protection tube 51 of the protection tube thermocouple 5c is remarkably small, as compared with the protection tube thermocouple 5a. This may lower the strength of the protection tube thermocouple 5c at a position where the cylindrical portion 533 is formed. Furthermore, in the protection tube thermocouple 5c, the outer diameter of the protection tube 51 is reduced. Therefore, it is impossible to use the protection tube thermocouple 5c as a replacement for the protection tube thermocouple which is currently used for measurement in a mixing machine. It is necessary to modify the structure of a mounting portion of a protection tube thermocouple in a mixing machine in order to mount the protection tube thermocouple 5c in the mixing machine.

In view of the above, the protection tube thermocouple 5 illustrated in FIG. 1 is configured such that the tapered portion 532 is formed on the front end 54 side of the hollow portion 53. According to this configuration, it is possible to maintain the value of the smallest thickness t1 of the protection tube 51 to be the value substantially the same as the value of the thickness t30 illustrated in FIG. 3, even if the Y-directional length Y1 of the frontal cylindrical portion 531 is made equal to the Y-directional length Y40 of the frontal cylindrical portion 531, as illustrated in FIG. 4, in order to reduce the volume of the protection tube 51 on the front end 54 side. Thus, it is possible to enhance the temperature responsiveness, while maintaining the strength of the protection tube 51.

Figure 2:
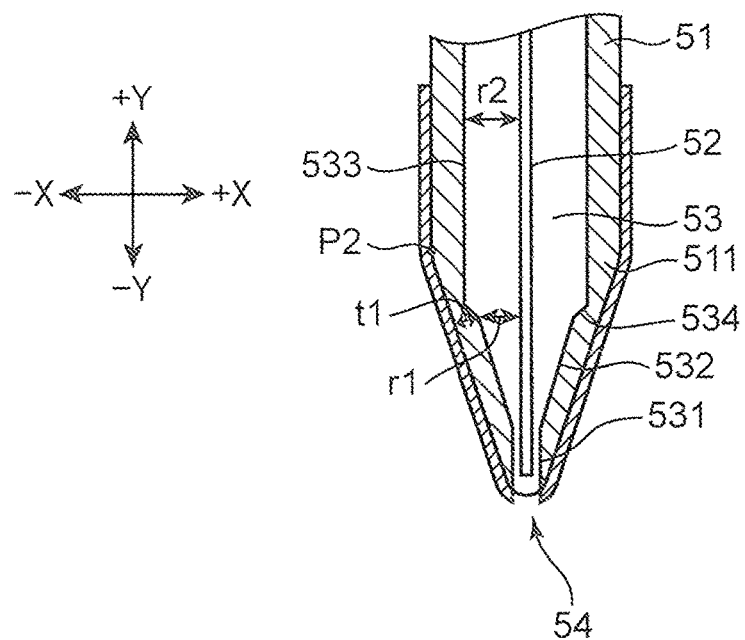
FIG. 2 is a diagram illustrating a modification of a protection tube thermocouple in the embodiment.

Alternatively, the protection tube thermocouple 5 in the embodiment may be modified as illustrated in FIG. 2. FIG. 2 is a diagram illustrating a modification of the protection tube thermocouple 5 in the embodiment. The protection tube thermocouple 5 illustrated in FIG. 2 has a feature such that a step portion 534 is formed at a connection position between the cylindrical portion 533 and a tapered portion 532 in the protection tube thermocouple 5 illustrated in FIG. 1. The configuration of the modification is the same as the configuration of the embodiment illustrated in FIG. 1 except for the above. Therefore, repeated description of the same configuration is omitted.

In FIG. 2, the radius r2 of the cylindrical portion 533 is set to be larger than the radius r1 of the tapered portion 532 on the rear end 55 side. This forms the step portion 534 at the connection position between the tapered portion 532 and the cylindrical portion 533.

In the configuration illustrated in FIG. 2, the heat transferred from the front end 54 side is less likely to be transferred to the rear end 55 side due to the existence of the step portion 534. Therefore, the heat is trapped on the front end 54 side of the protection tube thermocouple 5, and a temperature increment of the thermocouple 52 is increased. As a result, the temperature responsiveness of the protection tube thermocouple 5 is enhanced.

In FIG. 2, the smallest thickness t1 of the protection tube 51 retains the same value as the thickness t30 illustrated in FIG. 3, and the strength is maintained at a constant value.

In FIG. 1, the connection position P1 is provided on the front end 54 side with respect to the connection position P2, and the Y-directional length of the tapered portion 532 is set to be smaller than the Y-directional length of the conical portion 511. Likewise, in FIG. 2, the step portion 534 is provided on the front end 54 side with respect to the connection position P2, and the Y-directional length of the tapered portion 532 is set to be smaller than the Y-directional length of the conical portion 511. According to this configuration, the volume of the protection tube 51 on the front end 54 side is reduced, and the heat capacity thereof is reduced. As a result, the temperature responsiveness is enhanced.

In FIG. 1 and FIG. 2, the frontal cylindrical portion 531 is formed on the front end 54 side of the tapered portion 532. Alternatively, the frontal cylindrical portion 531 may be omitted.

The deterioration detection device in the embodiment determines deterioration of the protection tube thermocouple 5, with use of a temperature increment of the protection tube thermocouple 5 when current is applied to the thermocouple 52. Enhancing the temperature responsiveness of the protection tube thermocouple 5 makes it possible to shorten the current application time. This makes it possible to determine the wear of the protection tube thermocouple 5 in a short time. Further, reducing the volume of the protection tube 51 on the front end 54 side makes it possible to increase the ratio of the wear amount of the protection tube 51 with respect to the volume of the protection tube 51 on the front end 54 side, as compared with the case in which the volume is not reduced. This makes it possible to enhance the resolution of wear detection.

Figure 7:
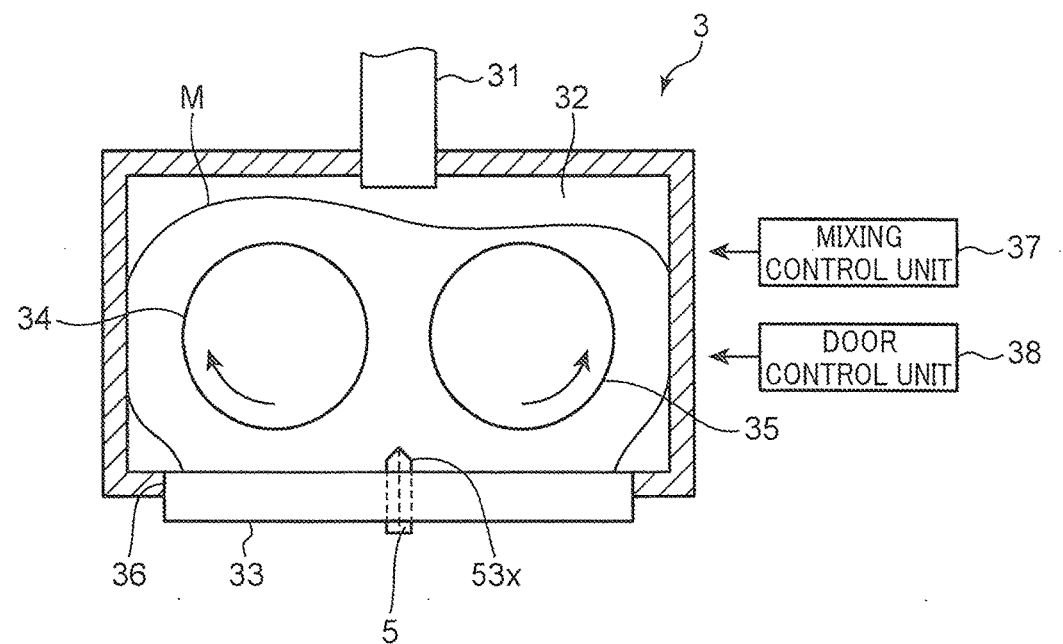
FIG. 7 is a schematic diagram illustrating a state that a mixing object is being mixed in the mixing machine illustrated in FIG. 6.
Figure 8:
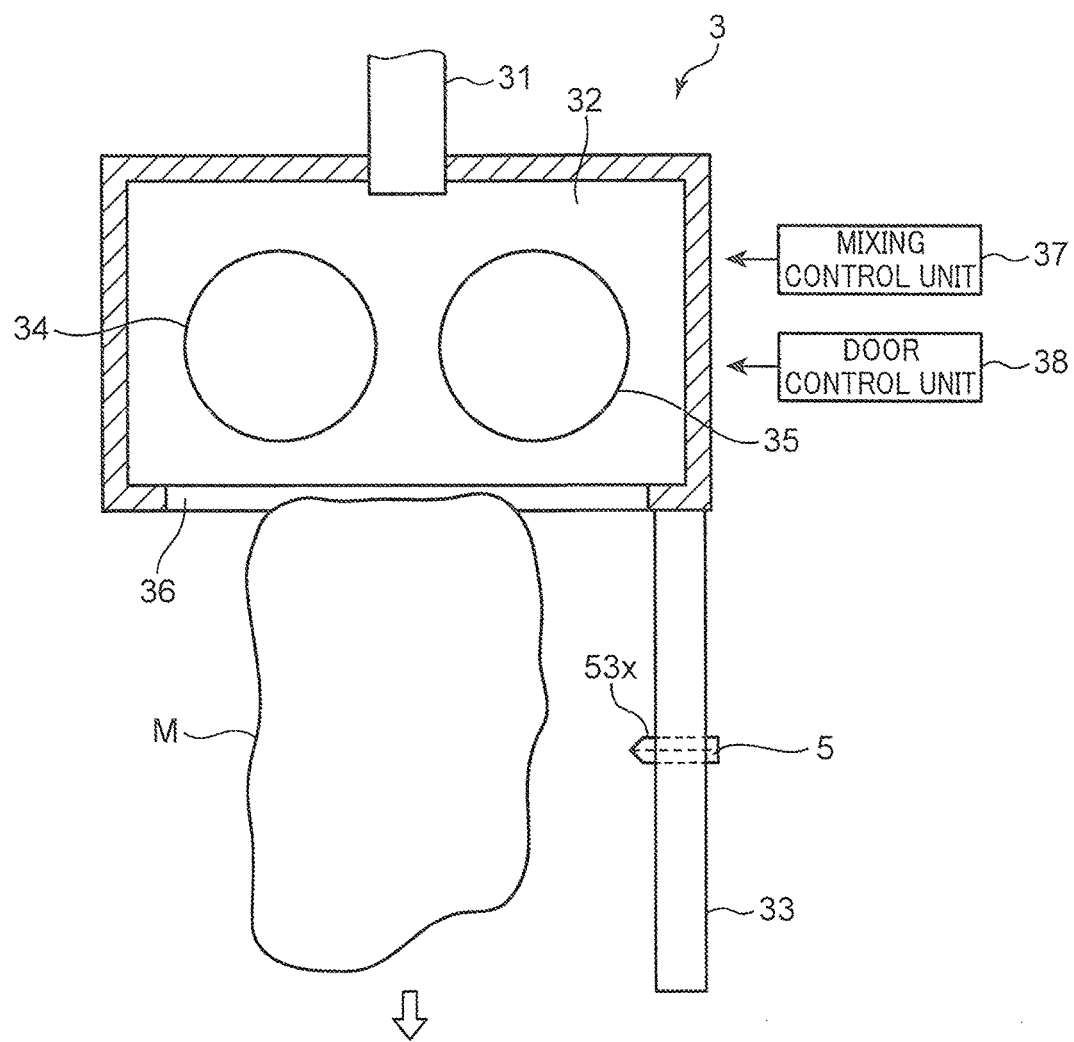
FIG. 8 is a schematic diagram illustrating a state that the mixing object is being taken out from the mixing machine illustrated in FIG. 6.

Next, a mixing machine 3 is described. FIG. 6 is a schematic diagram illustrating an example of the mixing machine 3. FIG. 7 is a schematic diagram illustrating a state that the mixing object M is being mixed by the mixing machine 3 illustrated in FIG. 6. FIG. 8 is a schematic diagram illustrating a state that the mixing object M is being taken out from the mixing machine 3 illustrated in FIG. 6.

Referring to FIG. 6, the mixing machine 3 is provided with a material supply pipe 31, the mixing chamber 32, the door portion 33, a mixing control unit 37, and a door control unit 38.

The material supply pipe 31 is disposed on the ceiling of the mixing chamber 32. A tip of the material, supply pipe 31 is guided to the mixing chamber 32 through the ceiling of the mixing chamber 32. The materials for the mixing object M are supplied to the mixing chamber 32 through the material supply pipe 31.

The mixing chamber 32 is illustrated in section. When predetermined materials are mixed into the mixing object M, the temperature of the mixing chamber 32 is set to be higher than the ambient temperature. For instance, when the mixing object is a rubber object, the temperature of the mixing chamber 32 is set to be hundred and several tens ° C. Two rollers 34 and 35 are disposed in the mixing chamber 32. Referring to FIG. 7, rotating the two rollers mixes the materials supplied to the mixing chamber 32, and the mixing object M is mixed.

The mixing control unit 37 controls mixing of the mixing object M in the mixing chamber 32. More specifically, the mixing control unit 37 performs a control of supplying the materials for the mixing object M from the material supply pipe 31 to the mixing chamber 32, a control of setting the temperature of the mixing chamber 32, and a control of rotating the rollers 34 and 35.

Referring to FIG. 6 and FIG. 8, a take-out port 36 of the mixing object NI is formed in the floor portion of the mixing chamber 32. When the door portion 33 is closed, the take-out port 36 is closed. When the door portion 33 is opened, the take-out port 36 is opened. When the door portion 33 is opened, the mixing object M in the mixing chamber 32 is allowed to fall through the take-out port 36, and is fed to the next process. The door portion 33 is closed when the mixing object M is being mixed in the mixing chamber 32, and the door portion 33 is opened when the mixing object M is taken out from the mixing chamber 32.

The door control unit 38 controls opening and closing of the door portion 33.

The mixing machine 3 repeats an operation of mixing the mixing object M in the mixing chamber 32, an operation of opening the door portion 33 in order to take out the mixing object M from the mixing chamber 32, and an operation of closing the door portion 33 in order to mix a next mixing object M in the mixing chamber 32.

Referring to FIG. 6, the protection tube thermocouple 5 is received in the door portion 33. The tip portion 53x of the protection tube 51 of the protection tube thermocouple 5 projects from the door portion 33 in such a manner that the tip portion 53x is located in the inside of the mixing chamber 32 in a state that the door portion 33 is closed, and the tip portion 53x is located on the outside of the mixing chamber 32 in a state that the door portion 33 is opened. The tip portion 53x is a contact portion with which the mixing object M comes into contact during mixing of the mixing object M.

Next, the plating layer 56 (see FIG. 1 and FIG. 2) formed on the surface of the protection tube 51 is described. As described above, the tip portion 53x of the protection tube 51 is a contact portion. An example of the material of the protection tube 51 is an SCM (chrome molybdenum steel) material in the aspect of heat resistance and strength. Rubber or plastic materials contain particles having a large hardness such as silica. An SCM material has a low wear resistance against silica. In view of the above, forming the plating layer 56 on the tip portion 53x, and making the plating layer 56 as a contact portion makes it possible to enhance the wear resistance of the contact portion.

As described above, forming the plating layer 56 as a contact portion enhances the wear resistance of the contact portion. However, the plating layer 56 may be worn away by silica. Therefore, when the protection tube thermocouple 5 is used for a long period of time, the plating layer 56 may be worn away and may be peeled off from the protection tube 51.

In view of the above, it is necessary to test whether the plating layer 56 is worn away. In the embodiment, the thermocouple test is the test as described above. Hereinafter, this test is simply called as a "wear test".

When current is supplied to the thermocouple 52, the temperature measuring contact 52c generates heat. The heat is absorbed by the tip portion 53x. The heat absorbing amount of the tip portion 53x devoid of the plating layer 56 is small, as compared with a tip portion 53x including a plating layer 56, by the amount corresponding to non-existence of the plating layer 56. Therefore, when current is supplied to the thermocouple 52, the temperature of the temperature measuring contact 52c is increased, in the case where the tip portion 53x does not include the plating layer 56, as compared with the case where a tip portion 53x includes a plating layer 56. (In other words, a temperature to be measured by the temperature measuring device 6 is increased). An experiment for verifying this matter was performed.

Temperatures of the thermocouple 52 of the protection tube thermocouple 5 were measured by the temperature measuring device 6 at a predetermined time interval, while continuing to supply current of 1.0 A to the thermocouple 52.

As protection tube thermocouples 5, a protection tube thermocouple 5 with an aluminum foil, and a protection tube thermocouple 5 without an aluminum foil were prepared. The protection tube thermocouple 5 with an aluminum foil is a protection tube thermocouple 5, in which an aluminum foil is attached to a tip portion 53x. The protection tube thermocouple 5 without an aluminum foil is a protection tube thermocouple 5, in which an aluminum foil is not attached to a tip portion 53x. The thickness of the aluminum foil was set to be 0.12 mm. The aluminum foil was regarded as the plating layer 56.

Figure 9:
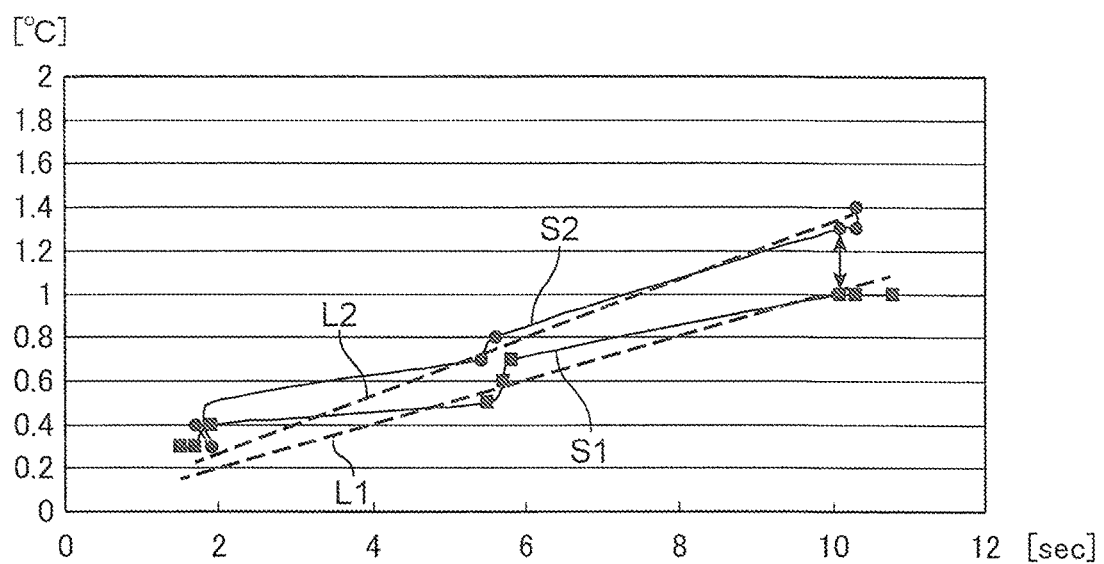
FIG. 9 is a graph illustrating a relationship between a time during which current is supplied to a thermocouple, and a temperature increment.

A result of the experiment is illustrated by the graph of FIG. 9. The horizontal axis of the graph represents a lapse of time after current was started to be supplied to the thermocouple 52. The unit of time is second. The vertical axis of the graph represents a temperature increment, with use of a temperature measured by the temperature measuring device 6 at a time before current was supplied to the thermocouple 52, as a reference temperature.

For instance, it is assumed that the temperature measured by the temperature measuring device 6 at a time before current was supplied to the thermocouple 52 is 30.0° C., and the temperature measured by the temperature measuring device 6 at a time when ten seconds have elapsed after current was supplied to the thermocouple 52 is 31.0° C. In this case, a temperature increment at the time when ten seconds have elapsed after current was supplied to the thermocouple 52 is 1.0° C.

The polygonal line S1 represents an experiment result of the protection tube thermocouple 5 with an aluminum foil. The line L1 is a line obtained by linear approximation of the polygonal line S1. The polygonal line S2 represents an experiment result of the protection tube thermocouple 5 without an aluminum foil. The line L2 is a line obtained by linear approximation of the polygonal line S2.

The temperature increment of the protection tube thermocouple 5 without an aluminum foil as represented by the polygonal line S2 is large, as compared with the protection tube thermocouple 5 with an aluminum foil as represented by the polygonal line S1. It is conceived that the above result is obtained due to non-existence of an aluminum foil.

For instance, when a time period for supplying current to the thermocouple 52 is ten seconds, a temperature increment of the protection tube thermocouple 5 with an aluminum foil as represented by the polygonal line S1 is 1.0° C. and a temperature increment of the protection tube thermocouple 5 without an aluminum foil as represented by the polygonal line S2 is 1.3° C.

In other words, the temperature increment of the protection tube thermocouple 5 in which a plating layer 56 is not peeled off is 1.0° C., and the temperature increment of the protection tube thermocouple 5 in which a plating layer 56 is peeled off by 0.12 mm is 1.3° C. It can be said that there is a temperature increment difference of 0.3° C.

When the thickness of the plating layer 56 is reduced on the tip portion 53x including the plating layer 56, the heat absorption amount of the tip portion 53x is reduced. Therefore, there is a relationship between the thickness of the plating layer 56 and the temperature increment of the temperature measuring contact 52c such that, as the thickness of the plating layer 56 reduces, the temperature increment of the temperature measuring contact 52c (in other words, the increment of the temperature measured by the temperature measuring device 6) increases. Therefore, supplying current to the thermocouple 52 for generating heat of the temperature measuring contact 52c, and using the increment of the temperature measured by the temperature measuring device 6 makes it possible to estimate the thickness (wear amount) of the plating layer 56. In the embodiment, the above idea is applied for performing a test (wear test) as to whether the plating layer 56 as a contact portion is worn away.

Next, a time period for performing the wear test is described. Referring to FIG. 7, the tip portion 53x of the protection tube 51 comes into contact with a mixing object M during mixing of the mixing object M. Therefore, it is impossible to perform the wear test during the mixing operation. There is proposed an idea of stopping the mixing machine 3 and performing the wear test in a state that the mixing object M is not present in the mixing chamber 32. However, in this configuration, the process of mixing the mixing object M is temporarily stopped. This is not efficient.

The mixing machine 3 repeats the following operations (1) to (4).

(1) Materials are supplied to the mixing chamber 32 in a state that the door portion 33 is closed;
(2) The materials are mixed in the mixing chamber 32 for mixing the mixing object M (see FIG. 7);
(3) The door portion 33 is opened, and the mixing object M in the mixing chamber 32 is fed to the next process (see FIGS. 8); and
(4) The door portion 33 is closed.

Performing the wear test during a time period when the door portion 33 is opened and the mixing object M is taken out from the mixing chamber 32 does not have to stop the operation of the mixing machine 3. This is efficient.

However, once the door portion 33 is opened, the tip portion 53x of the protection tube 51 is exposed to the ambient temperature environment. This may cause rapid lowering of a temperature to be measured by the temperature measuring device 6.

In view of the above, in order to know the increment of the temperature measured by the temperature measuring device 6 by current supply to the thermocouple 52 in a state that the door portion 33 is opened, it is necessary to eliminate an influence, namely, rapid temperature lowering due to opening of the door portion 33.

A temperature measured by the temperature measuring device 6 when current is supplied to the thermocouple 52 in a state that the door portion 33 is opened is defined as an actual temperature. Further, an ambient temperature of the thermocouple 52, which is estimated from the actual temperature after the door portion 33 is opened, is defined as an estimated temperature. The increment of the temperature measured by the temperature measuring device 6, due to heat generation of the temperature measuring contact 52c by current supply to the thermocouple 52, is defined as a temperature increment. Subtracting the estimated temperature from the actual temperature makes it possible to eliminate the aforementioned influence. In other words, the value obtained by subtracting the estimated temperature from the actual temperature is a temperature increment.

It is possible to obtain the estimated temperature with use of an exponential function expression as represented by the following expression (1). The expression (1) is a general expression representing a temperature lowering.

$$y = a \times \exp(b \times x) \quad (1)$$

where
y represents a temperature,
x represents a lapse of time, and
a, and b each represents a coefficient.

Among the parameters, "b" represents a degree of lowering in temperature, in other words, represents whether the temperature is rapidly lowered, or whether the temperature is slowly lowered. An approximation calculating unit 86 (see FIG. 10) to be described later calculates an approximation (in other Words, an expression for obtaining an estimated temperature), with use of the expression (1). The coefficients "a" and "b" are values that are calculated in advance, with use of an actual measurement value of ambient temperature of the thermocouple 52 to be obtained when the door portion 33 is opened.

Figure 10:
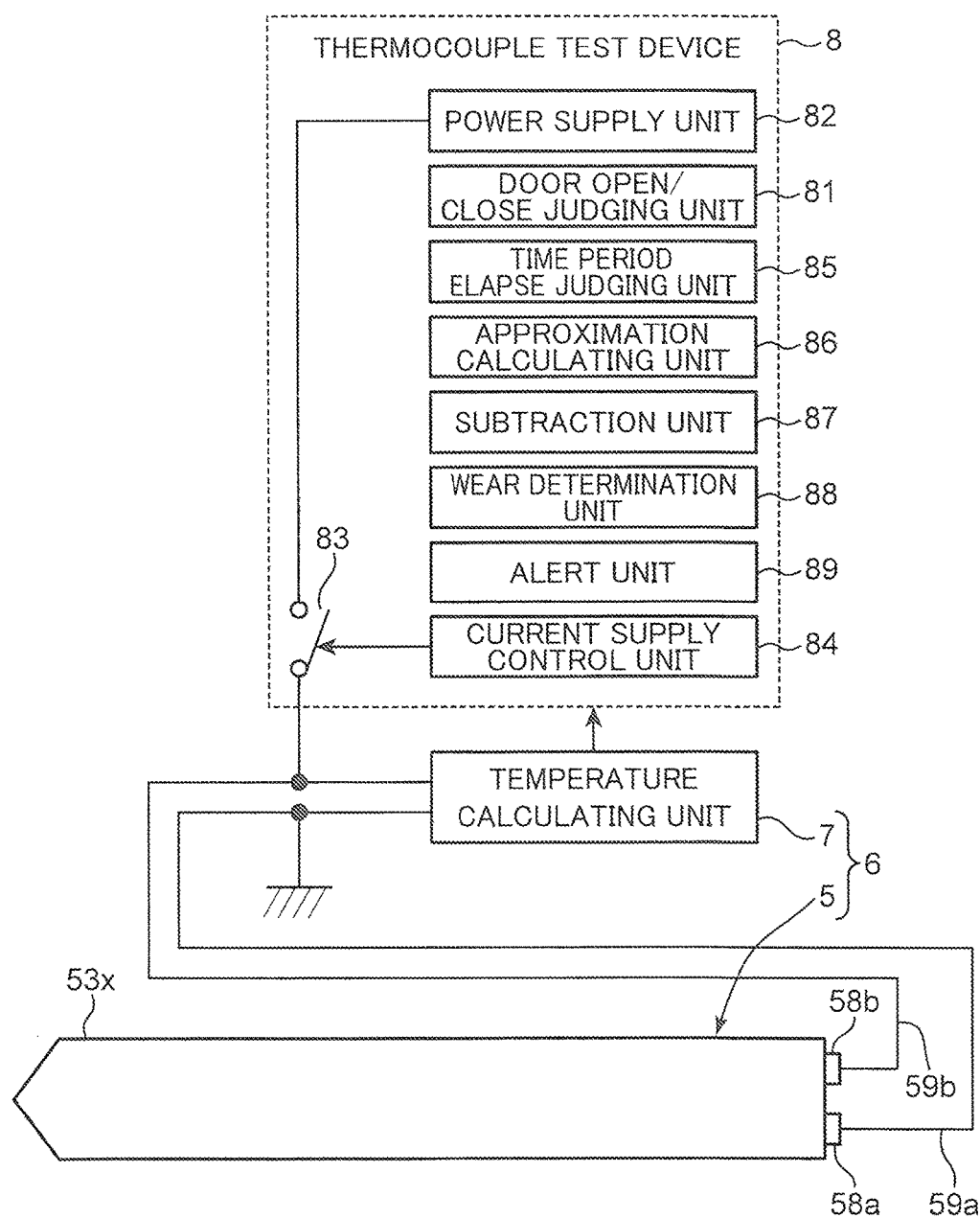
FIG. 10 is a block diagram illustrating a configuration of the deterioration detection device in the embodiment.

Next, a thermocouple test device 8 is described. FIG. 10 is a block diagram illustrating a configuration of the deterioration detection device in the embodiment. The deterioration detection device is provided with the thermocouple test device 8 and the temperature measuring device 6.

The thermocouple test device 8 performs a wear test, with use of a temperature measured by the temperature measuring device 6 illustrated in FIG. 1.

As illustrated in FIG. 7 and FIG. 8, the temperature measuring device 6 measures a temperature of the mixing object M being mixed in the mixing chamber 32, and measures a temperature around the plating layer 56 in a state that the door portion 33 is opened and the mixing object M does not come into contact with the plating layer 56, with use of the protection tube thermocouple 5.

The thermocouple test device 8 is provided with a door open/close judging unit 81, a power supply unit 82, a switch unit 83, a current supply control unit 84, a time period elapse judging unit 85, the approximation calculating unit 86, a subtraction unit 87, a wear determination unit 88, and an alert unit 89.

The door open/close judging unit 81 judges whether the door portion 33 is in an opened state, or the door portion 33 is in a closed state, on the basis of a signal output from an unillustrated sensor. The sensor outputs signals different from each other between a state that the door portion 33 is opened, and a state that the door portion 33 is closed.

The power supply unit 82 generates current to be supplied to the thermocouple 52.

The switch unit 83 is constituted of a transistor, for instance. When the switch unit 83 is in an on-state, current generated in the power supply unit 82 is supplied to the external wiring 59b. When the switch unit 83 is in an off-state, current generated in the power supply unit 82 is not supplied to the external wiring 59b.

The current supply control unit 84 controls on and off of the switch unit 83. More specifically, the current supply control unit 84 controls the switch unit 83 to switch from an off-state to an on-state when the door portion 33 is opened in order to take out the mixing object M from the mixing chamber 32; and controls the switch unit 83 to switch from the on-state to an off-state when a predetermined first time period has elapsed. According to this configuration, controlling the mixing machine 3 to open the door portion 33 in order to take out the mixing object M from the mixing chamber 32 allows current to be supplied to the thermocouple 52 during the first time period in a state that the door portion 33 is opened, and does not allow current to be supplied to the thermocouple 52 after the first time period has elapsed.

Figure 11:
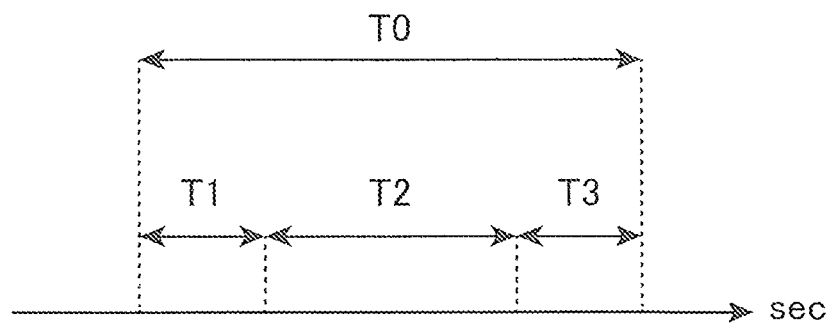
FIG. 11 is a time chart illustrating a wear test time period.

The time period elapse judging unit 85 judges whether a predetermined second time period has elapsed in a state that the door portion 33 is opened after the first time period has elapsed. FIG. 11 is a time chart illustrating a time period when the wear test is performed. The wear test time period T0 is divided into a first time period T1, a second time period T2, and a sampling time period T3. When the wear test time period T0 is four seconds, for instance, the first time period T1 is one second, the second time period T2 is two seconds, and the sampling time period is one second, for instance.

Supplying current to the thermocouple 52 during the first time period T1 generates heat of the temperature measuring contact 52c (see FIG. 1). The time period when the influence of heat generation remains is defined as the second time period T2, and the time period when the influence does not remain is defined as the sampling time period T3. The sampling time period T3 is described with use of the approximation calculating unit 86.

The approximation calculating unit 86 calculates the aforementioned expression for obtaining an estimated temperature, with use of the exponential function expression as represented by the aforementioned expression (1). In other words, the approximation calculating unit 86 calculates an approximation representing time-wise lowering of ambient temperature of the thermocouple 52 after the door portion 33 is opened, with use of an actual temperature calculated by the temperature calculating unit 7. In the following description, when it is assumed that current is not supplied to the thermocouple 52 during the first time period T1, the approximation calculating unit 86 calculates an approximation representing a temperature that is estimated to be measured by the temperature measuring unit 6 during the second time period 12. In other words, when it is assumed that current is not supplied to the thermocouple 52 during the first time period T1, the approximation calculating unit 86 calculates an approximation representing a temperature that is estimated to be measured when the temperature is measured with use of the protection tube thermocouple 5 during the second time period T2.

The approximation calculating unit 86 calculates an expression for estimating lowering of a temperature to be measured by the temperature measuring device 6 after elapse of the first time period T1 due to exposure of the protection tube thermocouple 5 to the external atmosphere of the mixing chamber 32 after the door portion 33 is opened.

Calculation of the approximation employs a temperature measured after the time period lapse judging unit 85 judges that the second time period 12 has elapsed (during the sampling time period T3), out of the temperatures measured by the temperature measuring device 6 in a state that the door portion 33 is opened. This is because the sampling time period 13 is defined as a time period when the influence of heat generation of the temperature measuring contact 52c by current supply to the thermocouple 52 during the first time period T1 does not remain.

As described above, the approximation is an expression representing a temperature (estimated temperature) that is estimated to be measured by the temperature measuring device 6 during the second time period 12, when it is assumed that current is not supplied to the thermocouple 52 during the first time period T1. If an approximation is calculated, with use of a temperature measured during a time period (in other words, during the second time period T2) when the influence of heat generation of the temperature measuring contact 52c remains, the approximation does not reflect an accurate estimated temperature.

The approximation calculating unit 86 acquires data on the temperatures measured by the temperature measuring device 6 at a predetermined time interval during the sampling time period T3.

The aforementioned approximation calculating method by the approximation calculating unit 86 is merely an example. Alternatively, the approximation calculating unit 86 may calculate an approximation from an actual temperature to be obtained after the first time period T1 has elapsed and after the door portion 33 is opened, without discriminating the second time period T2 of the thermocouple 52, and the sampling time period T3 from each other.

The subtraction unit 87 calculates a subtraction value obtained by subtracting a temperature represented by the approximation that has been calculated by the approximation calculating unit 86, from a temperature measured by the temperature measuring device 6 during the second time period T2. Specifically, the subtraction unit 87 calculates a subtraction value obtained by subtracting a temperature represented by the expression calculated by the approximation calculating unit 86, from a temperature measured by the temperature measuring device 6 after elapse of the first time period T1.

The wear determination unit 88 determines whether the plating layer 56 is worn away, using a feature such that the subtraction value increases in the case where the plating layer 56 is worn away, as compared with the case where the plating layer 56 is not worn away.

The alert unit 89 is a display unit, for instance, and notifies a result of determination by the wear determination unit 88.

Figure 12:
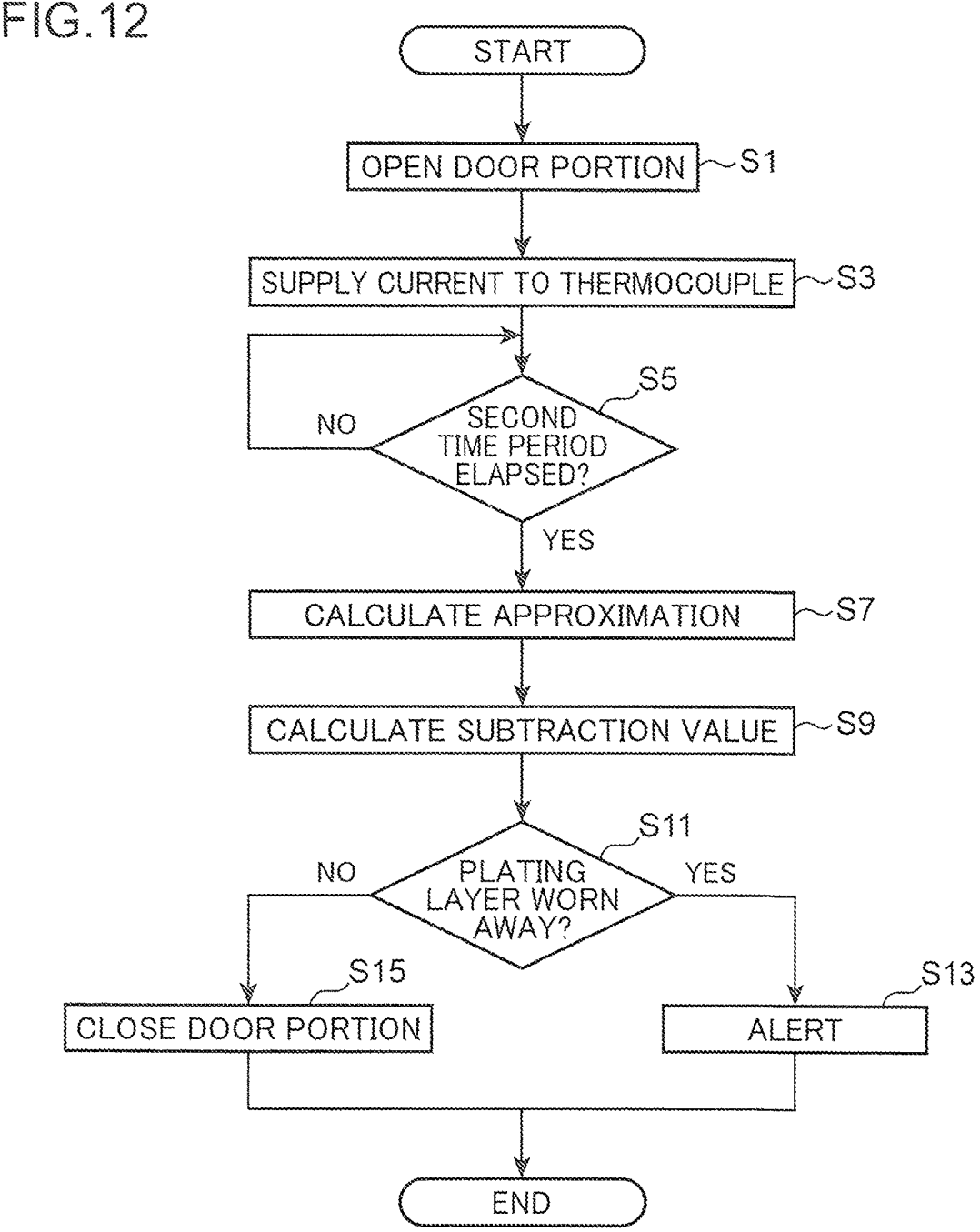
FIG. 12 is a flowchart describing an operation to be performed by the deterioration detection device in the embodiment.

Next, an operation to be performed by the thermocouple test device 8 in the embodiment is described. FIG. 12 is a flowchart describing the operation.

When the mixing control unit 37 of the mixing machine 3 illustrated in FIG. 8 judges that mixing of the mixing object M has completed, the door control unit 38 controls the door portion 33 to open in order to take out the mixing object M from the mixing chamber 32. In this way, the door open/close control unit 81 illustrated in FIG. 10 judges that the door portion 33 is opened (Step S1).

After the door open/close judging unit 81 judges that the door portion 33 is opened, the current supply control unit 84 supplies current to the thermocouple 52 (Step S3). More specifically, the current supply control unit 84 illustrated in FIG. 10 controls the switch unit 83 to switch from an off-state to an on-state, and after the first time period T1 (see FIG. 11) has elapsed, controls the switch unit 83 to switch from the on-state to an off-state. By performing the operation, current is supplied to the thermocouple 52 during the first time period T1, and as a result, the temperature measuring contact 52c (see FIG. 1) generates heat.

The time period elapse judging unit 85 judges whether the second time period T2 (see FIG. 11) has elapsed in a state that the door portion 33 is opened, after the first time period T1 has elapsed (Step S5). The door open/close judging unit 81 judges that the door portion 33 is opened.

When the time period elapse judging unit 85 judges that the second time period T2 has not elapsed (No in Step S5), the process of Step S5 is repeated.

When the time period elapse judging unit 85 judges that the second time period 12 has elapsed (Yes in Step S5), the approximation calculating unit 86 calculates an approximation (Step S7). This is described in detail.

Figure 13:
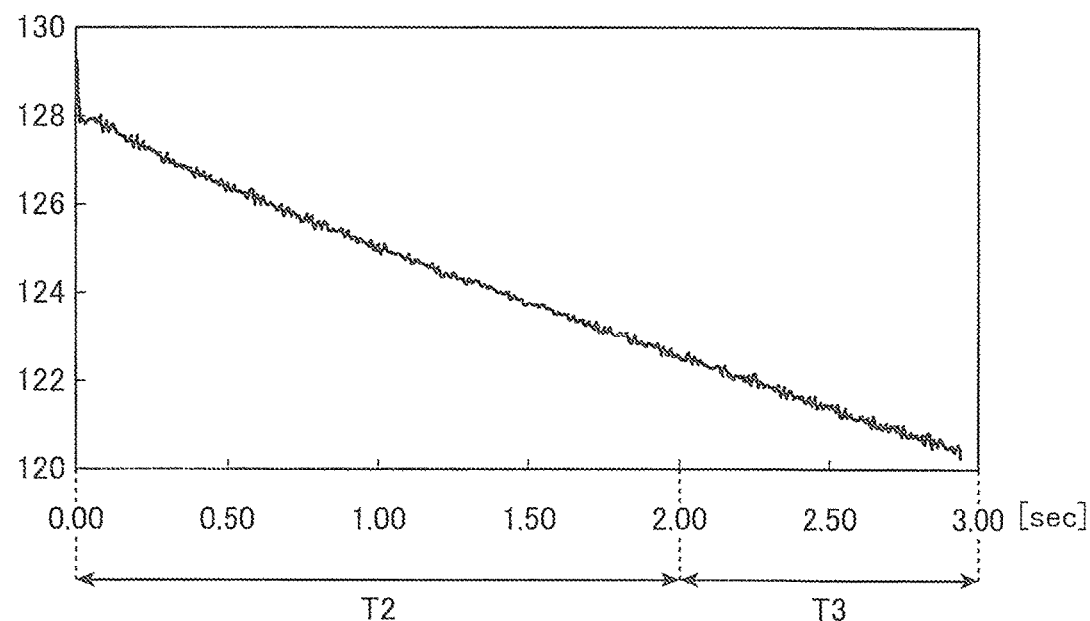
FIG. 13 is a graph illustrating temperatures measured by a temperature measuring device during a second time period and during a sampling time period.
Figure 14:
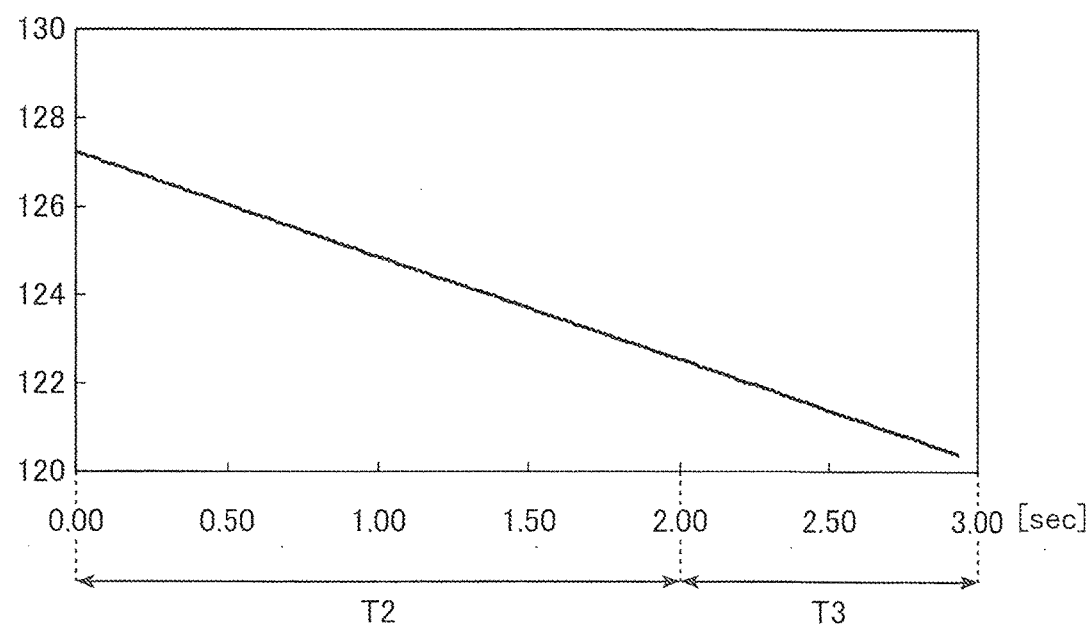
FIG. 14 is a graph illustrating an approximation calculated by an approximation calculating unit during the second time period and during the sampling time period.
Figure 15:
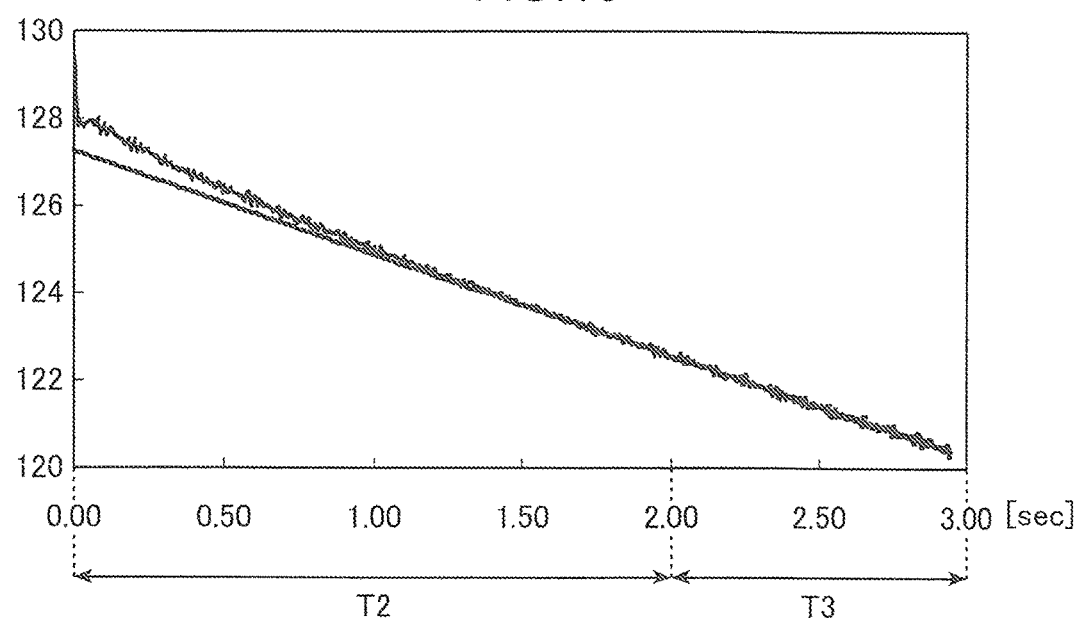
FIG. 15 is a graph obtained by overlapping the graph of FIG. 13 and the graph of FIG. 14.

FIG. 13 is a graph representing temperatures measured by the temperature measuring device 6 during the second time period T2 and during the sampling time period T3, in other words, a graph representing an actual temperature. FIG. 14 is a graph representing an approximation calculated by the approximation calculating unit 86 during the second time period T2 and during the sampling time period T3, in other words, a graph representing an estimated temperature. FIG. 15 is a graph obtained by overlapping the graph of FIG. 13 and the graph of FIG. 14. In FIG. 13 to FIG. 15, the horizontal axis represents a time (second), and the vertical axis represents a temperature (° C.) measured by the temperature measuring device 6. In the horizontal axis, a time period from 0.00 second to 2.00 seconds corresponds to the second time period T2, and a time period from 2.00 seconds to 3.00 seconds corresponds to the sampling time period T3.

Referring to FIG. 13, current supply to the thermocouple 52 is stopped at 0.00 second (in other words, at a time immediately after elapse of the first time period T1), and heat generation of the temperature measuring contact 52c (see FIG. 1) is stopped. As a result, at 0.00 second, the temperature measured by the temperature measuring device 6 is rapidly lowered.

Thereafter, the temperature measured by the temperature measuring device 6 continues to lower. This is because, as illustrated in HG 8, the door portion 33 of the mixing chamber 32 is kept in an opened state, and the protection tube thermocouple 5 is exposed to the ambient temperature environment.

The approximation calculating unit 86 acquires data on the temperatures measured by the temperature measuring device 6 at a time interval of 10μ seconds, for instance, during the sampling time period T3. When the sampling time period T3 is one second, one hundred pieces of temperature data are acquired.

The approximation calculating unit 86 calculates an approximation, with use of the acquired temperature data, and the exponential function expression as represented by the expression (1). An example of the approximation is as follows.

$$y=127.74e^{-0.0206}x \quad (2)$$

FIG. 14 illustrates a graph representing the expression (2). The graph is a graph representing an estimated temperature as described above.

The subtraction unit 87 calculates a subtraction value obtained by subtracting a temperature represented by an approximation calculated by the approximation calculating unit 86, from a temperature measured by the temperature measuring device 6 during the second time period T2 and during the sampling time period T3 (Step S9). The subtraction value is a value obtained by subtracting an estimated temperature from an actual temperature, and represents a temperature increment. The temperature increment is the increment of the temperature measured by the temperature measuring device 6 due to heat generation of the temperature measuring contact 52c during the first time period T1.

Figure 16:
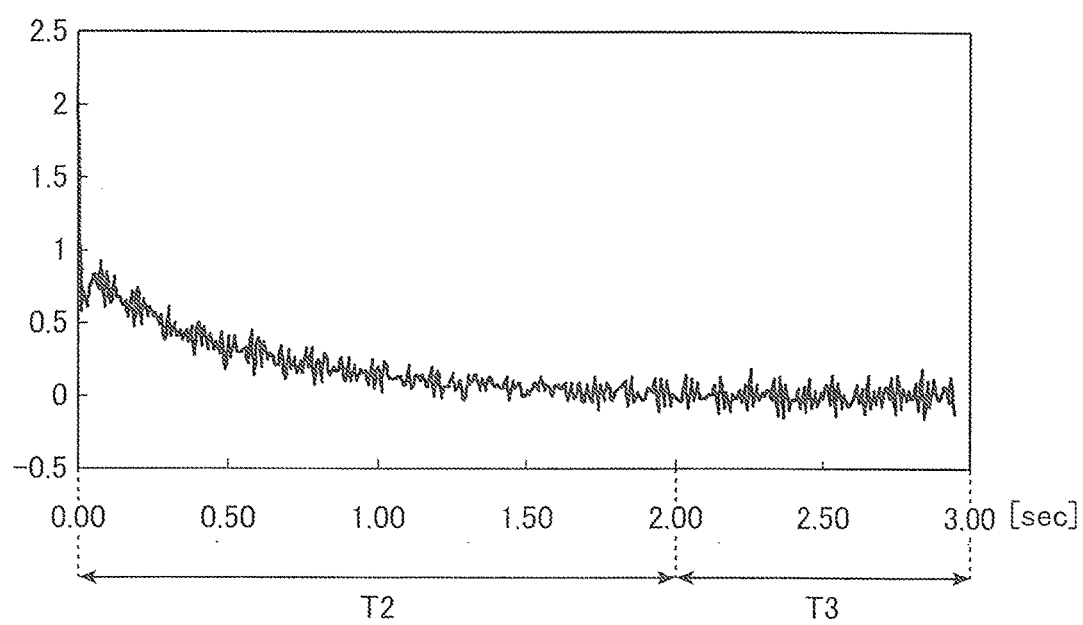
FIG. 16 is a graph illustrating a value obtained by subtracting the value indicated by the graph of FIG. 14 from the value indicated by the graph of FIG. 13.

More specifically, as illustrated in FIG. 16, the subtraction unit 87 calculates a graph representing a value, which is obtained by subtracting the value indicated by the graph of FIG. 14, from the value indicated by the graph of FIG. 13. In FIG. 16, the horizontal axis represents a time (second), and the vertical axis represents a temperature increment (° C.).

As described above, the graph of FIG. 13 is a graph representing a temperature (actual temperature) measured by the temperature measuring device 6 during the second time period T2 and during the sampling time period T3, when current is supplied to the thermocouple 52 during the first time period T1 On the other hand, the graph of FIG. 14 is a graph representing a temperature (estimated temperature) which is estimated to be measured by the temperature measuring device 6 during the second time period T2 and during the sampling time period T3, when current is not supplied to the thermocouple 52 during the first time period T1.

The temperature increment is larger than zero during the second time period T2. This is because the influence of heat generation of the temperature measuring contact 52c by current supply to the thermocouple 52 during the first time period T1 remains in the second time period T2. The temperature increment is substantially zero during the sampling time period T3. This is because the influence does not remain in the sampling time period T3.

The wear determination unit 88 judges whether the plating layer 56 is worn away, with use of the temperature increment (subtraction value) during the second time period T2 illustrated in FIG. 16 (Step S11). There are proposed several methods for judging whether the plating layer 56 is worn away. For instance, when the temperature increment during a predetermined time (for instance, 0.50 second) within the second time period T2 exceeds a predetermined threshold value, it is judged that the plating layer 56 is worn away; and when the temperature increment does not exceed the threshold value, it is judged that the plating layer 56 is not worn away.

Further, when the gradient of the graph illustrated in FIG. 16 exceeds a predetermined threshold value during a predetermined time within the second time period T2, it is judged that the plating layer 56 is worn away; and when the gradient does not exceed the threshold value, it is judged that the plating layer 56 is not worn away.

Alternatively, the wear of the plating layer 56 may be judged, with use of the graph of FIG. 16, after a process of subjecting the graph of FIG. 16 to moving average is performed during the second time period T2 illustrated in FIG. 16. Performing moving average calculation makes it possible to smoothen the graph of FIG. 16. This is advantageous in reducing a temperature increment error.

When the wear determination unit 88 judges that the plating layer 56 is worn away (Yes in Step S11), the alert unit 89 displays an alert to exchange the protection tube thermocouple 5 (Step S13).

When the wear determination unit 88 judges that the plating layer 56 is not worn away (No in Step S11), the door control unit 38 of the mixing machine 3 illustrated in FIG. 6 controls to close the door portion 33 (Step S15). After the door portion 33 is closed, the mixing control unit 37 controls to mix a next mixing object M in the mixing chamber 32.

In the foregoing description, the wear test is performed only one time during an operation of opening and closing the door portion 33 one time. Alternatively, the wear test may be performed two or more times during an operation of opening and closing the door portion 33 one time. When it is assumed that the first time period T1 is 1.0 second, the second time period T2 is 2.0 seconds, the sampling time period. T3 is 1.0 second, and the time period when the door portion 33 is kept in an opened state is 15 seconds, the deterioration detection device can perform the wear test three times. When the wear determination unit 88 judges that the plating layer 56 is worn away by at least one of the three-times wear test, the alert unit 89 displays an alert to exchange the protection tube thermocouple 5.

Alternatively, the wear test may be performed each time the door portion 33 is opened and closed. Further alternatively, the wear test may be performed each time a predetermined time period has elapsed (for instance, once a day).

The main effects of the embodiment are described. In the embodiment, referring to FIG. 1, the wear of the plating layer 56 is determined, using a feature such that the increment of the temperature measured by the temperature measuring device 6 increases when current is supplied to the thermocouple 52, in the case where the plating layer 56 (contact portion) is worn away, as compared with the case where the plating layer 56 is not worn away.

Referring to FIG. 8, when the wear test of the plating layer 56 is performed in a state that the door portion 33 of the mixing chamber 32 is opened, it is necessary to eliminate an influence, namely, rapid lowering of a temperature measured by the temperature measuring device 6 due to opening of the door portion 33.

A temperature measured by the temperature measuring device 6 when current is supplied to the thermocouple 52 in a state that the door portion 33 is opened is defined as an actual temperature (see FIG. 13). Further, a temperature, which is estimated to be measured by the temperature measuring device 6 when current is not supplied to the thermocouple 52 in a state that the door portion 33 is opened, is defined as an estimated temperature. In the embodiment, a temperature represented by an approximation calculated by the approximation calculating unit 86 is defined as the estimated temperature (see FIG. 14). Furthermore, the increment of the temperature measured by the temperature measuring device 6 due to heat generation of the temperature measuring contact 52c by current supply to the thermocouple 52 is defined, as a temperature increment.

The actual temperature includes an influence, namely, rapid temperature lowering due to opening of the door portion 33. On the other hand, the estimated temperature represents rapid temperature lowering due to opening of the door portion 33. Therefore, subtracting the estimated temperature from the actual temperature makes it possible to calculate a temperature increment reflecting that the aforementioned influence is removed from the actual temperature (see FIG. 16).

As described above, according to the embodiment, it is possible to test whether the plating layer 56 which comes into contact with a mixing object M is worn away, in the protection tube 51 provided in the protection tube thermocouple 5 for use in measuring a temperature of the mixing object M. and in which the thermocouple 52 is accommodated.

Further, according to the embodiment, as described above referring to the flowchart of FIG. 12, the wear test is performed when the door portion 33 is opened in order to take out the mixing object M from the mixing chamber 32. Therefore, it is possible to perform the wear test during an operation of the mixing machine 3. During the operation of the mixing machine 3, a process of mixing the mixing object M in the mixing chamber 32, opening the door portion 33 in order to take out the mixing object M, and closing the door portion 33 in order to mix a next mixing object M in the mixing chamber 32 is repeated. Therefore, according to the embodiment, it is not necessary to stop the operation of the mixing machine 3 in order to perform the wear test.

There is a relationship between the thickness of the plating layer 56 (see FIG. 1), and the temperature increment such that, as the thickness of the plating layer 56 reduces, the temperature increment increases. According to the embodiment, it is possible to predict a wear amount (a worn thickness) of the plating layer 56. Therefore, it is possible to issue an alert to exchange the protection tube thermocouple 5 at an appropriate timing before the plating layer 56 is worn away, and the protection tube 51 is damaged or broken.

Referring to FIG. 1, reducing the thickness of the protection tube 51 leads to reduction of the heat capacity of the protection tube 51. This makes it possible to provide a protection tube thermocouple 5 with an enhanced responsiveness. However, the reduced thickness of the protection tube 51 may cause immediate damage or breakage of the protection tube 51, once the plating layer 56 is peeled off by wear. In the embodiment, it is possible to predict the wear amount of the plating layer 56. Therefore, it is possible to use a protection tube 51 of a small thickness.

The protection tube 51 with a small thickness has a small heat capacity. Therefore, when the wear test is performed, the temperature increment of the protection tube 51 increases. This is advantageous in accurately determining whether the plating layer 56 is worn away.

In the embodiment, the plating layer 56 which covers the tip portion 53x of the protection tube 51 is a contact portion. The invention is also applicable to a configuration, in which a tip portion 53x of a protection tube 51 is not covered with a plating layer 56, in other words, a configuration, in which a tip portion 53x does not include a plating layer 56.

Figure 17:
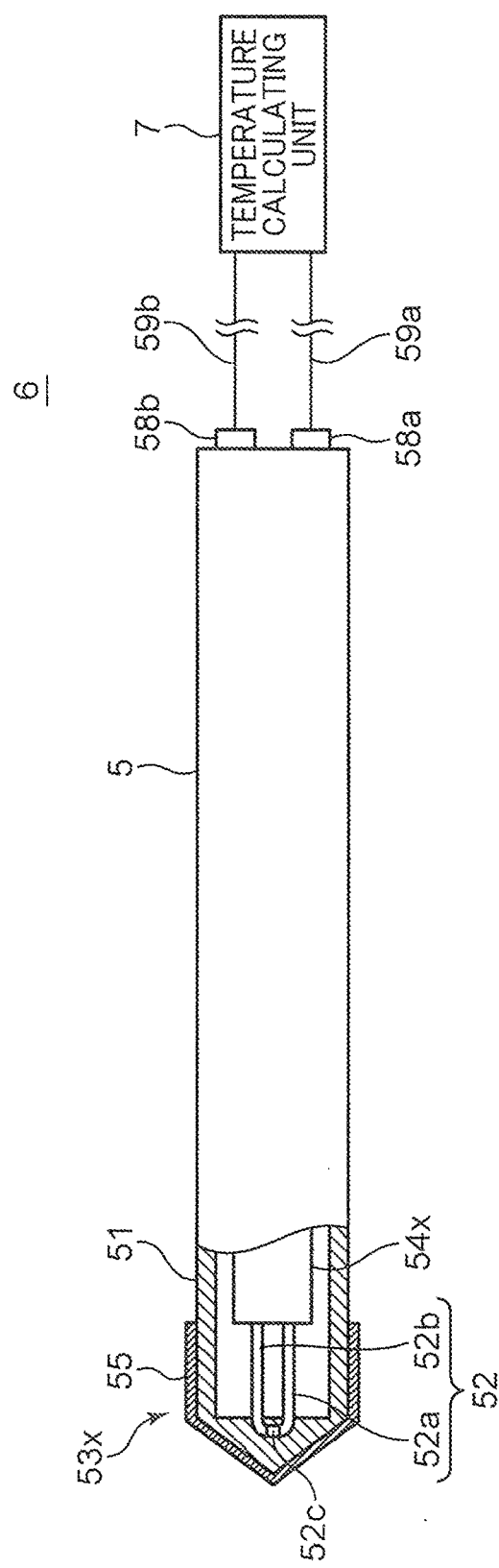
FIG. 17 is a diagram illustrating a modification of the temperature measuring device provided with the protection tube thermocouple in the embodiment.

FIG. 17 is a diagram illustrating a modification of a temperature measuring device 6 provided with a protection tube thermocouple 5. The temperature measuring device 6 is provided with the protection tube thermocouple 5 and a temperature calculating unit 7.

The protection tube thermocouple 5 is provided with a protection tube 51 and a thermocouple 52.

The protection tube 51 is an example of a tubular member, and accommodates the thermocouple 52. A tip portion 53x of the protection tube 51 is illustrated in section.

The thermocouple 52 is constituted of two wires 52a and 52b. The two wires 52a and 52b are insulated from each other by an insulating tube 54x. One end of the thermocouple 52 includes a temperature measuring contact 52c, and is exposed from the insulating tube 54x. The temperature measuring contact 52c is attached to the tip portion 53x of the protection tube 51 by welding.

The tip portion 53x of the protection tube 51 is covered with a plating layer 56. Specifically, the tip portion 53x of the protection tube 51 is the tip portion 53x including the plating layer 56. In the tip portion 53x including the plating layer 56, the plating layer 56 serves as a contact portion.

Terminals 58a and 58b are mounted on a rear end surface of the protection tube 51. The wire 52a is electrically connected to an external wiring 59a by the terminal 58a. The wire 52b is electrically connected to an external wiring 59b by the terminal 58b.

The thermocouple used in the embodiment is not limited to the protection tube thermocouple 5. As far as a thermocouple 52 is accommodated in a tubular member, it is possible to use any type of the thermocouple (for instance, a sheath thermocouple).

The temperature calculating unit 7 is electrically connected to the external wirings 59a and 59b. The thermocouple 52 generates a thermoelectromotive force by the heat transferred to the temperature measuring contact 52c. The thermoelectromotive force is transmitted to the temperature calculating unit 7 by the external wirings 59a and 59b. The temperature calculating unit 7 calculates a temperature (for instance, a temperature of the mixing object M in the mixing chamber 32 illustrated in FIG. 2), with use of the transmitted thermoelectromotive force. The temperature measuring device 6 is a device for measuring a temperature, with use of a thermoelectromotive force generated in the thermocouple 52.

SUMMARY OF EMBODIMENT

A deterioration detection device according to the embodiment is a deterioration detection device provided with a protection tube thermocouple for detecting deterioration of the protection tube thermocouple by applying current to the protection tube thermocouple. The protection tube thermocouple includes a thermocouple, and a protection tube which accommodates the thermocouple. The protection tube includes a conical portion formed on a front end side of the protection tube; and a hollow portion which extends in a length direction of the protection tube for connecting between a front end and a rear end of the protection tube in the inside of the protection tube, and into which the thermocouple is received. The hollow portion in the conical portion has a tapered portion configured such that a sectional area of the hollow portion decreases toward the front end.

For instance, as illustrated in FIG. 4, when the cylindrical portion 533 formed in the hollow portion 53 is formed on the front end 54 side, the volume of the protection tube 52 is reduced, and the responsiveness of the protection tube 52 is enhanced. However, in this case, the thickness t40 of the step portion 535 which connects between the cylindrical portion 535 and the frontal cylindrical portion 531 is reduced. This may lower the strength of the protection tube 52.

In view of the above, in the above aspect, a tapered portion is formed on the front end side of the hollow portion. This makes it possible to secure the thickness of the protection tube on the front end side, and to reduce the volume of the protection tube for reducing the heat capacity of the protection tube. As a result, it is possible to maintain the strength of the protection tube thermocouple, and to enhance the responsiveness of the protection tube thermocouple.

Further, in the above aspect, the hollow portion may include a cylindrical portion which is formed on a rear end side with respect to the tapered portion, and which has a diameter larger than the sectional area of the tapered portion on the rear end side; and a step portion which connects between the cylindrical portion and the tapered portion.

In the above configuration, the heat transferred from the front end side is less likely to be transferred to the rear end side. The heat is trapped on the front end side of the protection tube thermocouple, and the temperature increment of the thermocouple increases. As a result, the responsiveness of the protection tube thermocouple is enhanced.

Further, in the above aspect, a plating layer may be formed on a surface of the protection tube.

In the above configuration, it is possible to enhance the wear resistance of the protection tube.

Further, in the above aspect, the protection tube thermocouple may be mounted on a door portion of a mixing machine, the door portion being opened when a mixing object is taken out from a mixing chamber. The protection tube may include a contact portion, the contact portion being a portion with which the mixing object comes into contact. The deterioration detection device may further include a current supply control unit which supplies current to the thermocouple during a predetermined first time period after the door portion is opened; a temperature calculating unit which calculates a temperature of the thermocouple after the door portion is opened, with use of a thermoelectromotive force generated in the thermocouple by current supply for the first time period; an approximation calculating unit which calculates an approximation representing time-wise lowering of ambient temperature of the thermocouple after the door portion is opened, with use of temperatures calculated by the temperature calculating unit; a subtraction unit which calculates a subtraction value obtained by subtracting a temperature represented by the approximation, from the temperature calculated by the temperature calculating unit; a wear determination unit which determines whether the contact portion is worn away on the basis of the subtraction value; and an alert unit which notifies a result of determination by the wear determination unit.

According to this configuration, it is possible to determine the wear of the contact portion, using a feature such that the increment of the temperature calculated by the temperature calculating unit increases when current is supplied to the thermocouple, in the case where the contact portion is worn away, as compared with the case where the contact portion is not worn away.

When the wear test of the contact portion is performed in a state that the door portion of the mixing chamber is opened, it is necessary to eliminate an influence, namely, rapid lowering of a temperature to be measured by the temperature calculating unit due to opening of the door portion.

In the above aspect, an approximation representing time-wise lowering of ambient temperature after the door portion is opened is calculated, and a subtraction value is calculated by subtracting a temperature represented by the approximation, from a temperature calculated by the temperature calculating unit. The subtraction value represents a temperature change of the thermocouple after the door portion is opened, which is free of time-wise lowering of ambient temperature of the thermocouple due to opening of the door portion. As a result, it is possible to determine the wear of the protection tube, with use of the subtraction value, and it is possible to accurately determine the wear of the protection tube.

Further, in the above aspect, the deterioration detection device may further include a time period elapse judging unit which judges whether a predetermined second time period has elapsed after the first time period has elapsed. The approximation calculating unit may calculate the approximation, with use of a temperature calculated by the temperature calculating unit during a predetermined sampling time period after the second time period has elapsed.

The temperature measuring contact of the thermocouple generates heat by current supply to the thermocouple during the first time period. The time period when the influence of heat generation remains is defined as the second time period, and the time period when the influence does not remain is defined as the sampling time period. According to this configuration, an approximation is calculated, with use of a temperature measured by the temperature measuring device during the sampling time period when the influence does not remain. Therefore, it is possible to accurately estimate lowering of a temperature to be measured by the temperature measuring device.

In the above configuration, the contact portion may include a plating layer.

The protection tube thermocouple is provided with the plating layer serving as a contact portion in order to enhance the wear resistance against the materials of the mixing object. However, a long time use of the protection tube thermocouple may cause wear of the plating layer. The above configuration is an example, in which the invention is applied to a protection tube thermocouple provided with a plating layer as a contact portion.

A thermocouple test device according to another aspect of the invention is a thermocouple test device for detecting deterioration of a protection tube thermocouple provided with a protection tube including a contact portion, the contact portion being a portion with which a mixing object comes into contact, and a thermocouple accommodated in the protection tube. The thermocouple test device includes a current supply control unit which supplies current to the thermocouple during a predetermined first time period; a time period elapse judging unit which judges whether a predetermined second time period has elapsed after the first time period has elapsed; an approximation calculating unit which calculates an approximation representing time wise lowering of ambient temperature of the thermocouple, with use of a temperature measured during a sampling time period after the time period elapse judging unit judges that the second time period has elapsed, out of temperatures measured with use of the protection tube thermocouple; a subtraction unit which calculates a subtraction value obtained by subtracting a temperature represented by the approximation calculated by the approximation calculating unit, from a temperature measured with use of the protection tube thermocouple during the second time period; a wear determination unit which determines whether the contact portion is worn away on the basis of the subtraction value; and an alert unit which notifies a result of determination by the wear determination unit.

According to this configuration, a protection tube thermocouple for use in measuring a temperature of a mixing object is provided for the same reason as applied to the deterioration detection device. It is possible to test whether a portion of the protection tube which comes into contact with the mixing object is worn away, in the protection tube in which a thermocouple is accommodated.

The invention claimed is:
1. A deterioration detection device provided with a protection tube thermocouple for detecting deterioration of the protection tube thermocouple by applying current to the protection tube thermocouple, wherein the protection tube thermocouple includes a thermocouple, and a protection tube which accommodates the thermocouple, the protection tube includes:
   a conical portion formed on a front end side of the protection tube;
   a hollow portion which extends in a length direction of the protection tube for connecting between a front end and a rear end of the protection tube in the inside of the protection tube, and into which the thermocouple is received; and
   a main body portion formed on the rear end side with respect to the conical portion, the hollow portion in the conical portion has a tapered portion configured such that a sectional area of the hollow portion decreases toward the front end, and the hollow portion includes:
   a cylindrical portion which is formed on the rear end side with respect to the tapered portion, a radius of the cylindrical portion being set to be larger than a radius of the tapered portion on the rear end side; and
   a step portion which is formed within the conical portion on the front end side with respect to a connection position between the conical portion and the main body portion, and which connects between the cylindrical portion and the tapered portion.

2. The deterioration detection device according to claim 1, wherein
   a plating layer is formed on a surface of the protection tube.

3. The deterioration detection device according to claim 1, wherein
   the step portion reduces a wall thickness of the protection tube from the tapered portion towards the cylindrical portion in the conical portion.

4. A deterioration detection device provided with a protection tube thermocouple for detecting deterioration of the protection tube thermocouple by applying current to the protection tube thermocouple, wherein the protection tube thermocouple includes a thermocouple, and a protection tube which accommodates the thermocouple, the protection tube includes:
   a conical portion formed on a front end side of the protection tube; and
   a hollow portion which extends in a length direction of the protection tube for connecting between a front end and a rear end of the protection tube in the inside of the protection tube, and into which the thermocouple is received, the hollow portion in the conical portion has a tapered portion configured such that a sectional area of the hollow portion decreases toward the front end, the protection tube thermocouple is mounted on a door portion of a mixing machine, the door portion being opened when a mixing object is taken out from a mixing chamber, the protection tube includes a contact portion, the contact portion being a portion with which the mixing object comes into contact, and the deterioration detection device further comprises:
   a current supply control unit which supplies current to the thermocouple during a predetermined first time period after the door portion is opened;
   a temperature calculating unit which calculates a temperature of the thermocouple after the door portion is opened, with use of a thermoelectromotive force generated in the thermocouple by current supply for the first time period;

an approximation calculating unit which calculates an approximation representing time-wise lowering of ambient temperature of the thermocouple after the door portion is opened, with use of the temperature calculated by the temperature calculating unit;

a subtraction unit which calculates a subtraction value obtained by subtracting a temperature represented by the approximation, from the temperature calculated by the temperature calculating unit;

a wear determination unit which determines whether the contact portion is worn away on the basis of the subtraction value; and an alert unit which notifies a result of determination by the wear determination unit.

5. The deterioration detection device according to claim 4, further comprising:

a time period elapse judging unit which judges whether a predetermined second time period has elapsed after the first time period has elapsed, wherein the approximation calculating unit calculates the approximation, with use of a temperature calculated by the temperature calculating unit during a predetermined sampling time period after the second time period has elapsed.

6. The deterioration detection device according to claim 4, wherein the contact portion includes a plating layer.

7. A thermocouple test device for detecting deterioration of a protection tube thermocouple provided with a protection tube including a contact portion, the contact portion being a portion with which a mixing object comes into contact, and a thermocouple accommodated in the protection tube, comprising:

a current supply control unit which supplies current to the thermocouple during a predetermined first time period;

a time period elapse judging unit which judges whether a predetermined second time period has elapsed after the first time period has elapsed;

an approximation calculating unit which calculates an approximation representing time-wise lowering of ambient temperature of the thermocouple, with use of a temperature measured during a sampling time period after the time period elapse judging unit judges that the second time period has elapsed, out of temperatures measured with use of the protection tube thermocouple;

a subtraction unit which calculates a subtraction value obtained by subtracting a temperature represented by the approximation calculated by the approximation calculating unit, from a temperature measured with use of the protection tube thermocouple during the second time period;

a wear determination unit which determines whether the contact portion is worn away on the basis of the subtraction value; and an alert unit which notifies a result of determination by the wear determination unit.

* * * * *